US012030463B2

(12) United States Patent
Robertson, Jr. et al.

(10) Patent No.: US 12,030,463 B2
(45) Date of Patent: Jul. 9, 2024

(54) SENSOR ASSEMBLY WITH CLEANING

(71) Applicant: Ford Global Technologies, LLC, Dearborn, MI (US)

(72) Inventors: Michael Robertson, Jr., Garden City, MI (US); Rashaun Phinisee, Ypsilanti, MI (US); Venkatesh Krishnan, Canton, MI (US); Anthony Michael Regalbuto, Highland, MI (US); Kunal Chaudhari, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 17/517,883

(22) Filed: Nov. 3, 2021

(65) Prior Publication Data

US 2023/0135748 A1 May 4, 2023

(51) Int. Cl.
*B60S 1/54* (2006.01)
*B60S 1/56* (2006.01)
*G02B 21/00* (2006.01)
*G02B 23/00* (2006.01)
*G02B 27/00* (2006.01)
*G01S 17/931* (2020.01)

(52) U.S. Cl.
CPC . *B60S 1/56* (2013.01); *B60S 1/54* (2013.01); *G02B 27/0006* (2013.01); *G01S 17/931* (2020.01)

(58) Field of Classification Search
CPC . B60S 1/54; B60S 1/56; G01S 17/931; G02B 23/00; G02B 21/00; G02B 27/00; G02B 1/00
USPC ................... 348/148, 207.99, FOR. 184, 61
See application file for complete search history.

(56) References Cited

U.S. PATENT DOCUMENTS

| 9,625,714 B2 | 4/2017 | Rousseau |
| 2021/0103036 A1 | 4/2021 | Robertson, Jr. et al. |
| 2021/0400179 A1* | 12/2021 | Brown ................... G03B 17/55 |

FOREIGN PATENT DOCUMENTS

| CN | 209176649 U | 7/2019 |
| CN | 110369397 A | 10/2019 |

* cited by examiner

*Primary Examiner* — Daquan Zhao
(74) *Attorney, Agent, or Firm* — Frank A. MacKenzie; Bejin Bieneman PLC

(57) ABSTRACT

A sensor assembly includes a sensor including a sensor lens, the sensor lens defining an axis; a housing panel including an aperture centered on the axis, the sensor lens being recessed from the aperture along the axis; and an air nozzle positioned between the aperture and the sensor lens along the axis and oriented to blow horizontally across the sensor lens. The aperture and the sensor lens define a gap positioned on an opposite lateral side of the sensor lens from the air nozzle.

20 Claims, 8 Drawing Sheets

SENSOR ASSEMBLY WITH CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
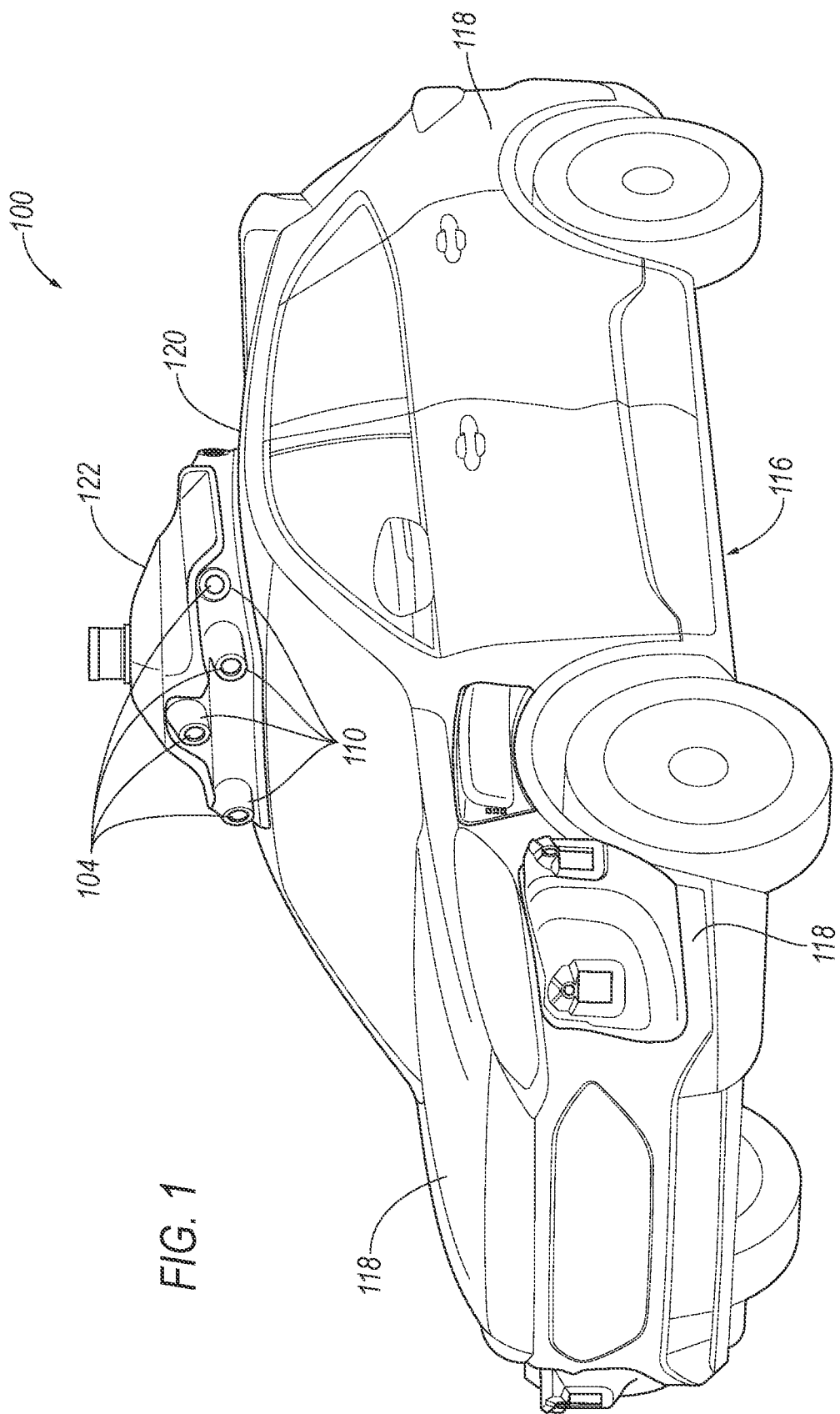
FIG. 1 is a perspective view of an example vehicle with an example sensor assembly.

A sensor assembly includes a sensor including a sensor lens, the sensor lens defining an axis; a housing panel including an aperture centered on the axis, the sensor lens being recessed from the aperture along the axis; and an air nozzle positioned between the aperture and the sensor lens along the axis and oriented to blow horizontally across the sensor lens. The aperture and the sensor lens define a gap positioned on an opposite lateral side of the sensor lens from the air nozzle.

The aperture may have a circular shape that is orthogonal to the axis.

The aperture and the sensor lens may further define the gap positioned in an upward direction from the sensor lens.

The aperture and the sensor lens may further define the gap positioned in a downward direction from the sensor lens.

The aperture and the sensor lens may further define the gap extending circumferentially around the axis from the air nozzle to the air nozzle. The gap may have a constant axial width between the sensor lens and the aperture circumferentially around the axis from the air nozzle to the air nozzle.

The axis may be oriented horizontally.

The sensor assembly may further include a housing including the housing panel, the housing may include a chamber, and the gap may be positioned to direct airflow from the air nozzle into the chamber. The housing may include a drainage channel positioned inside the chamber and shaped to direct fluid to outside the housing.

The sensor may be positioned in the chamber.

The sensor may be a first sensor, the sensor lens may be a first sensor lens, the aperture may be a first aperture, the housing panel may be a first housing panel, the air nozzle may be a first air nozzle, the gap may be a first gap, the sensor assembly may further include a second sensor including a second sensor lens defining a second axis and a second air nozzle, the housing may include a second housing panel including a second aperture centered on the second axis, the second sensor lens may be recessed from the second aperture along the second axis, the second air nozzle may be positioned between the second aperture and the second sensor lens along the second axis and oriented to blow horizontally across the second sensor lens, the second aperture and the second sensor lens may define a second gap positioned on an opposite lateral side of the second sensor lens from the second air nozzle, and the second gap may be positioned to direct airflow from the second air nozzle into the chamber. The first sensor and the second sensor may be positioned in the chamber.

The housing panel may include a recessed portion, and the aperture may be positioned at a most recessed point of the recessed portion. The recessed portion may extend from the aperture radially outwardly and axially away from the sensor lens relative to the axis.

The sensor assembly may further include a blower positioned to supply airflow to the air nozzle. The sensor assembly may further include a duct positioned to direct airflow from the blower to the air nozzle.

The sensor assembly may further include a liquid nozzle positioned between the aperture and the sensor lens along the axis and oriented to spray across the sensor lens. The liquid nozzle may be positioned circumferentially relative to the axis less than 90° from the air nozzle.

The liquid nozzle may be positioned in the gap.

The air nozzle may include an outlet having a slot shape elongated parallel to the sensor lens.

With reference to the Figures, wherein like numerals indicate like parts throughout the several views, a sensor assembly 102 of a vehicle 100 includes a sensor 104 including a sensor lens 106, the sensor lens 106 defining an axis A; a housing panel 108 including an aperture 110 centered on the axis A, the sensor lens 106 being recessed from the aperture 110 along the axis A; and an air nozzle 112 positioned between the aperture 110 and the sensor lens 106 along the axis A and oriented to blow horizontally across the sensor lens 106. The aperture 110 and the sensor lens 106 define a gap 114 positioned on an opposite lateral side of the sensor lens 106 from the air nozzle 112.

The gap 114 can provide a path for the airflow that travels across the sensor lens 106 from the air nozzle 112. The sensor assembly 102 can thus avoid a "dead zone" of low-speed or still air on a portion of the sensor lens 106 farthest from the air nozzle 112. Such a dead zone can prevent fluid or debris from being removed from that portion of the sensor lens 106. Moreover, by permitting the airflow to travel inside the housing panel 108, the sensor assembly 102 can help prevent fluid or debris from being carried by the airflow to other sensor lenses 106 of the sensor assembly 102.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer can be programmed to operate the vehicle 100 independently of the intervention of a human operator, completely or to a lesser degree. The computer may be programmed to operate the propulsion, brake system, steering system, and/or other vehicle systems based at least in part on data received from the sensors 104. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a body 116. The vehicle 100 may be of a unibody construction, in which a frame and the body 116 of the vehicle 100 are a single component. The vehicle 100 may, alternatively, be of a body-on-frame construction, in which the frame supports the body 116 that is a separate component from the frame. The frame and the body 116 may be formed of any suitable material, for example, steel, aluminum, etc. The body 116 includes body panels 118 partially defining an exterior of the vehicle 100. The body panels 118 may present a class-A surface, e.g., a finished surface exposed to view by a customer and free of unaesthetic blemishes and defects. The body panels 118 include, e.g., a roof 120, etc.

The sensor assembly 102 includes a housing 122 for the sensors 104. The housing 122 is attachable to the vehicle 100, e.g., to one of the body panels 118 of the vehicle 100, e.g., the roof 120. For example, the housing 122 may be shaped to be attachable to the roof 120, e.g., may have a shape matching or following a contour of the roof 120. The housing 122 may be attached to the roof 120, which can provide the sensors 104 with unobstructed fields of view of areas around the vehicle 100. The housing 122 may be formed of, e.g., plastic or metal.

Figure 2:
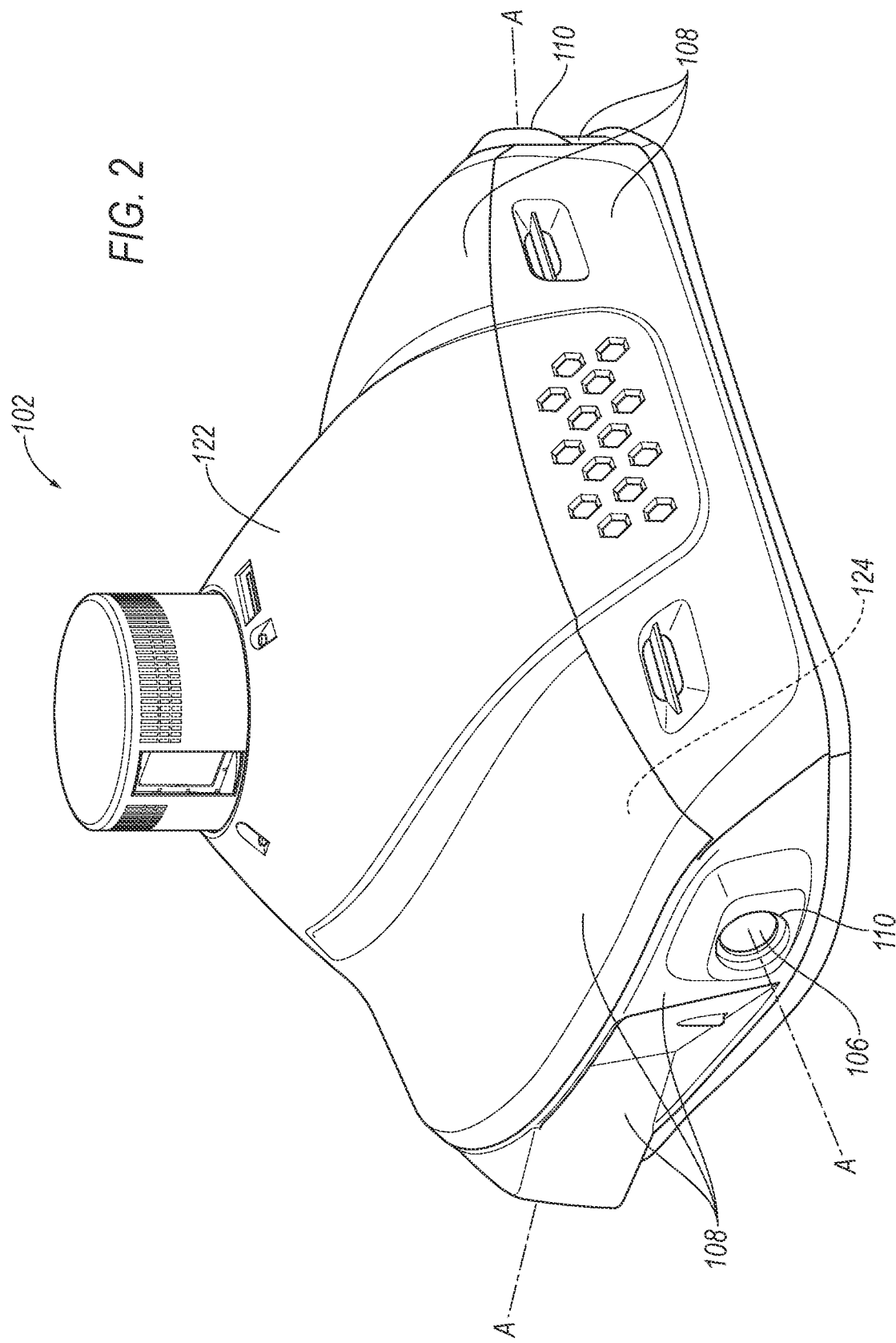
FIG. 2 is a rear perspective view of the sensor assembly.

With reference to FIG. 2, the housing 122 includes one or more housing panels 108 partially forming a chamber 124 inside the housing 122, and the housing 122 includes the chamber 124 formed at least partially of the housing panels 108. The housing panels 108 form an exterior of the housing 122 and are exposed to the ambient environment.

Figure 3:
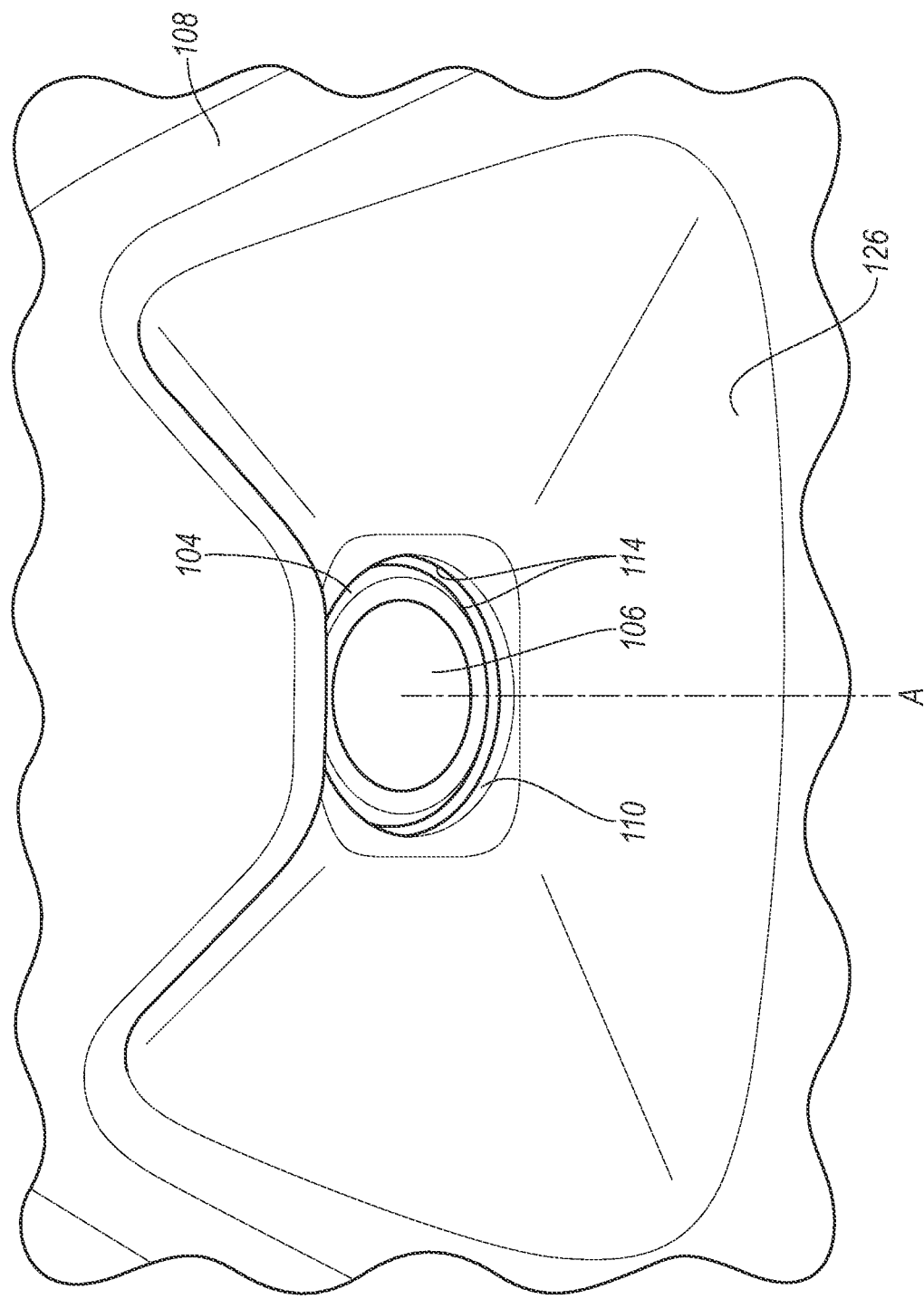
FIG. 3 is a perspective view of a portion of the sensor assembly.

With reference to FIG. 3, the housing 122 includes the apertures 110. The apertures 110 are holes in the housing 122 leading from the chamber 124 to the ambient environment. The apertures 110 are through the housing panels 108. The apertures 110 are circular in shape. The housing 122 includes one aperture 110 for each of the sensors 104. Each sensor 104 has a field of view defined by the sensor lens 106 through the respective aperture 110 through the respective housing panel 108. Each sensor lens 106 can define an axis A on which the respective aperture 110 is centered, i.e., the axis A passes through a geometric center of a shape formed by the respective aperture 110. The aperture 110 can have a circular shape that is orthogonal to the axis A.

The housing panels 108 can include one or more recessed portions 126. The recessed portions 126 extend inward relative to the housing 122 from the rest of the respective housing panels 108. Each recessed portion 126 can include one of the apertures 110. The aperture 110 can be positioned at a most recessed point of the recessed portion 126, i.e., a point farthest inward from the rest of the housing panel 108. The recessed portion 126 can extend from the aperture 110 radially outwardly and axially away from the sensor lens 106 relative to the axis A defined by the sensor lens 106. For example, the recessed portion 126 can have a frustoconical or pyramidal shape with an apex in the chamber 124 behind the aperture 110.

The recessed portions 126 can be necessitated by the packaging of the components inside the housing 122 and the fields of view of the sensors 104. The recessed portions 126 can increase a susceptibility of the sensor lenses 106 to having dead zones, so the benefits of the gap 114 described above can be especially helpful when the sensor 104 is located at one of the recessed portions 126.

Figure 4:
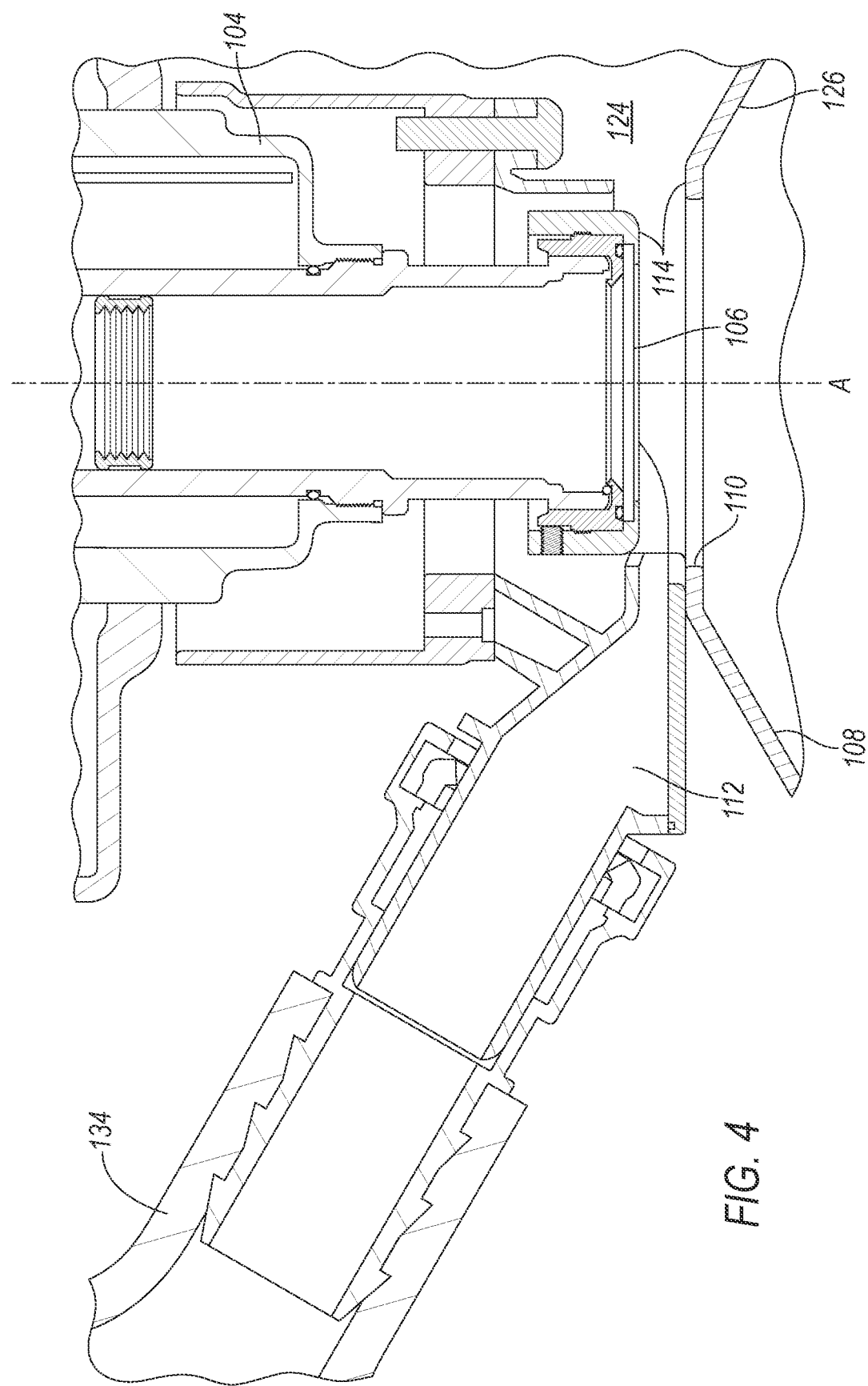
FIG. 4 is a top cross-sectional view of a portion of the sensor assembly.

With reference to FIG. 4, the sensors 104 are positioned in the chamber 124. The sensors 104 may detect the external world, e.g., objects and/or characteristics of surroundings of the vehicle 100, such as other vehicles, road lane markings, traffic lights and/or signs, pedestrians, etc. For example, the sensors 104 may include radar sensors, scanning laser range finders, light detection and ranging (LIDAR) devices, and image processing sensors such as cameras. As cameras, the sensors 104 can detect electromagnetic radiation in some range of wavelengths. For example, the sensors 104 may detect visible light, infrared radiation, ultraviolet light, or some range of wavelengths including visible, infrared, and/or ultraviolet light. For example, the sensors 104 can be a charge-coupled devices (CCD), complementary metal oxide semiconductors (CMOS), or any other suitable type. For another example, the sensors 104 may be time-of-flight (TOF) cameras, which include a modulated light source for illuminating the environment and detect both reflected light from the modulated light source and ambient light to sense reflectivity amplitudes and distances to the scene.

The sensors 104 include the respective sensor lenses 106. The sensor lenses 106 may be convex. Each sensor lens 106 may define the field of view of the respective sensor 104 through the aperture 110 through the housing panel 108. Each sensor lens 106 defines the respective axis A, around which the sensor lens 106 is radially symmetric. The axis A extends along a center of the field of view of the respective sensor 104. The axis A can be oriented horizontally, i.e., the sensor 104 can have a field of view extending laterally outward from the vehicle 100. The sensor lens 106 can be recessed from the aperture 110 along the axis A, i.e., the sensor lens 106 is spaced from the aperture 110 along the axis A into the chamber 124.

Figure 5:
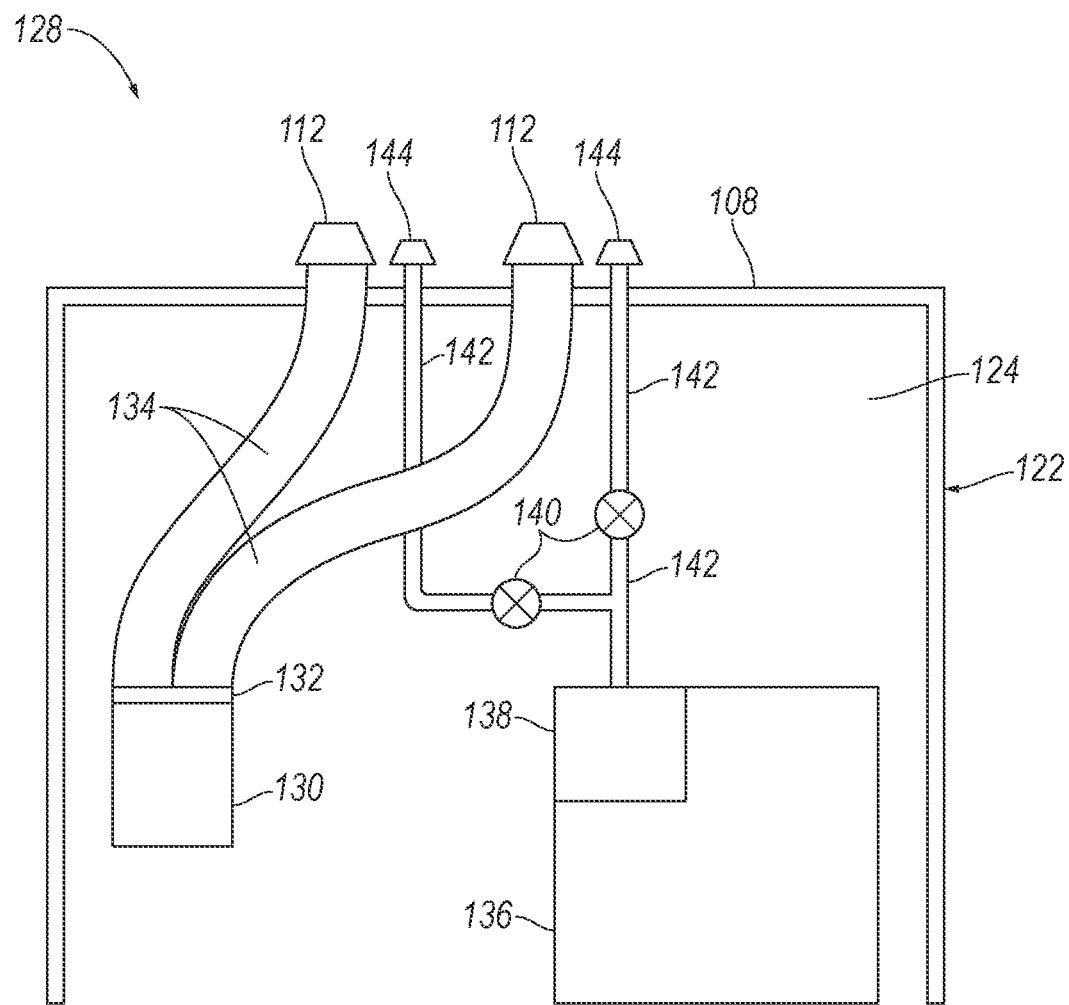
FIG. 5 is a diagram of an example cleaning system of the sensor assembly.

With reference to FIG. 5, the sensor assembly 102 includes a cleaning system 128. The cleaning system 128 includes a pressure source 130, a filter 132, ducts 134, and the air nozzles 112. The pressure source 130 and the air nozzles 112 are fluidly connected to each other (i.e., fluid can flow from one to the other) through the ducts 134. The pressure source 130, the filter 132, and the ducts 134 can be positioned inside the housing 122, e.g., in the chamber 124.

The pressure source 130 can be positioned to supply airflow to the air nozzles 112, e.g., by forcing air through the ducts 134. The pressure source 130 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type. The pressure source 130 can be positioned to draw air from an ambient environment outside the housing 122 and to blow the air into the ducts 134. The pressure source 130 can be sized to provide air for cleaning multiple sensors 104, e.g., two sensors 104.

The filter 132 can remove solid particulates such as dust, pollen, mold, dust, and bacteria from air flowing through the filter 132. The filter 132 may be any suitable type of filter, e.g., paper, foam, cotton, stainless steel, oil bath, etc.

The ducts 134 can be positioned to direct airflow from the pressure source 130 to the air nozzles 112. For example, the ducts 134 can extend from the pressure source 130 to the respective air nozzles 112, e.g., a first duct 134 to a first air nozzle 112 and a second duct 134 to a second air nozzle 112. The ducts 134 may be, e.g., flexible tubes.

Figure 6:
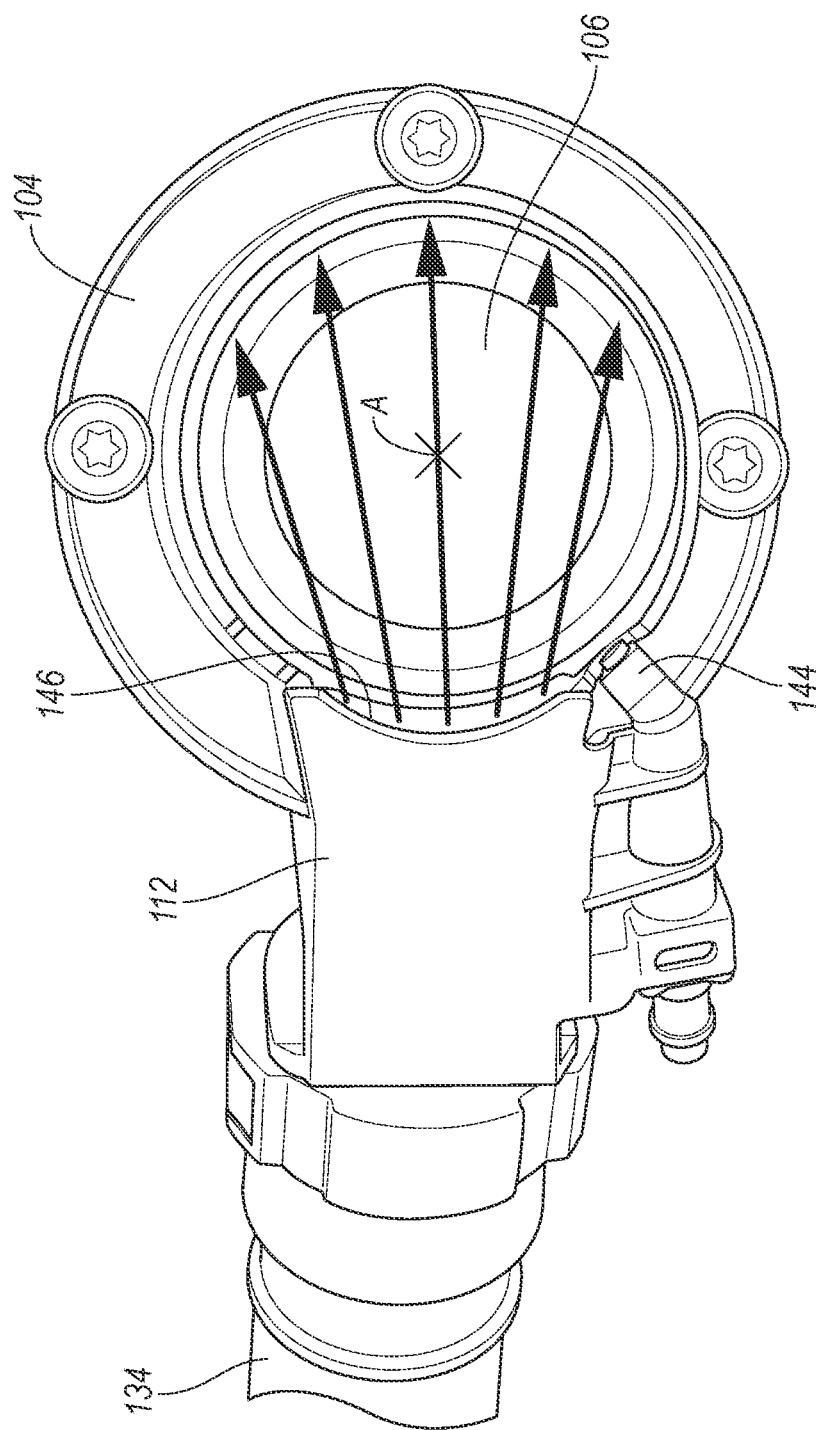
FIG. 6 is a plan view of an example sensor and nozzles of the sensor assembly.

Returning to FIG. 4, the air nozzles 112 can be fixed relative to the respective sensor lenses 106. The air nozzles 112 can be positioned to direct airflow out of the air nozzles 112 across the respective sensor lenses 106, e.g., may be aimed at the respective sensor lenses 106 at an oblique angle. The air nozzles 112 can be positioned between the respective apertures 110 and the respective sensor lenses 106 along the respective axes A. The air nozzles 112 can be oriented to blow horizontally across the respective sensor lenses 106, as illustrated in FIG. 6. The horizontal orientation of the air nozzles 112 can minimize interference from ambient airflow caused by movement of the vehicle 100. For the sensor 104 located on a lateral side of the housing 122, the air nozzles 112 can be oriented to blow horizontally in a vehicle-rearward direction.

With reference again to FIG. 5, the cleaning system 128 can further include a reservoir 136, a pump 138, valves 140, supply lines 142, and liquid nozzles 144. The reservoir 136, the pump 138, and the liquid nozzles 144 are fluidly connected to each other, i.e., fluid can flow from one to the other, via the supply lines 142. The cleaning system 128 distributes washer fluid stored in the reservoir 136 to the liquid nozzles 144. "Washer fluid" is any liquid stored in the reservoir 136 for cleaning. The washer fluid may include solvents, detergents, diluents such as water, etc.

The reservoir 136 may be a tank fillable with liquid, e.g., washer fluid for window cleaning. The reservoir 136 may be disposed in a front of the vehicle 100, e.g., in an engine compartment forward of a passenger cabin, or may be disposed in the housing 122. The reservoir 136 may store the washer fluid only for supplying the sensor assembly 102 or also for other purposes, such as supply to the windshield.

The pump 138 may force the washer fluid through the supply lines 142 to the liquid nozzles 144 with sufficient pressure that the washer fluid sprays from the liquid nozzles 144. The pump 138 is fluidly connected to the reservoir 136. The pump 138 may be attached to or disposed in the reservoir 136. The pump 138 may be sized to provide washer fluid to multiple liquid nozzles 144, e.g., two liquid nozzles 144.

Each valve 140 is positioned and operable to control fluid flow from the pump 138 to one of the liquid nozzles 144. Specifically, fluid from the supply line 142 from the pump 138 must flow through one of the valves 140 to reach the respective supply line 142 providing fluid to the respective liquid nozzle 144. The valves 140 control flow by being actuatable between an open position permitting flow and a closed position blocking flow from the incoming to the outgoing of the supply lines 142. The valves 140 can be solenoid valves. As a solenoid valve, each valve 140 includes a solenoid and a plunger. Electrical current through the solenoid generates a magnetic field, and the plunger moves in response to changes in the magnetic field. The solenoid moves the plunger between a position in which the valve 140 is open and a position in which the valve 140 is closed.

The supply lines 142 extend from the pump 138 to the liquid nozzles 144. The supply lines 142 may be, e.g., flexible tubes or hoses.

With reference to FIG. 6, the liquid nozzles 144 are fixed relative to the respective sensor lenses 106. The liquid nozzles 144 can be positioned to direct washer fluid out of the liquid nozzles 144 onto the respective sensor lenses 106, e.g., may be aimed at the respective sensor lenses 106 at an oblique angle. The liquid nozzles 144 can be oriented to spray across the respective sensor lenses 106, e.g., oriented so that a center of the spray intersects the axis A defined by the sensor lens 106.

The liquid nozzle 144 can be positioned between the aperture 110 and the sensor lens 106 along the axis A. More specifically, the liquid nozzle 144 can be positioned in the gap 114 between the aperture 110 and the sensor lens 106. The liquid nozzle 144 can be positioned circumferentially relative to the axis A less than 90° from the air nozzle 112. For example, as shown in FIG. 6, an angle around the axis A between the center of the air nozzle 112 and the center of the liquid nozzle 144 is approximately 45°. The circumferential position of the liquid nozzle 144 can direct the spray from the liquid nozzle 144 into the gap 114, like the airflow from the air nozzle 112. The spray is therefore less likely to be carried to other sensor lenses 106 of the sensor assembly 102.

Each air nozzle 112 can include an outlet 146 having a slot shape, i.e., that is significantly longer in a first direction than in an orthogonal second direction. The slot shape of the outlet 146 can be elongated parallel to the sensor lens 106, i.e., elongated in a plane orthogonal to the axis A defined by the sensor lens 106. The outlet 146 can be elongated along a circumferential path around the axis A at a constant radius from the axis A. For example, the outlet 146 can be formed by two walls extending along the direction of elongation and two walls extending perpendicular to the direction of elongation. The slot shape oriented parallel to the sensor lens 106 can provide complete coverage of the sensor lens 106 by the airflow from the air nozzle 112.

Figure 7:
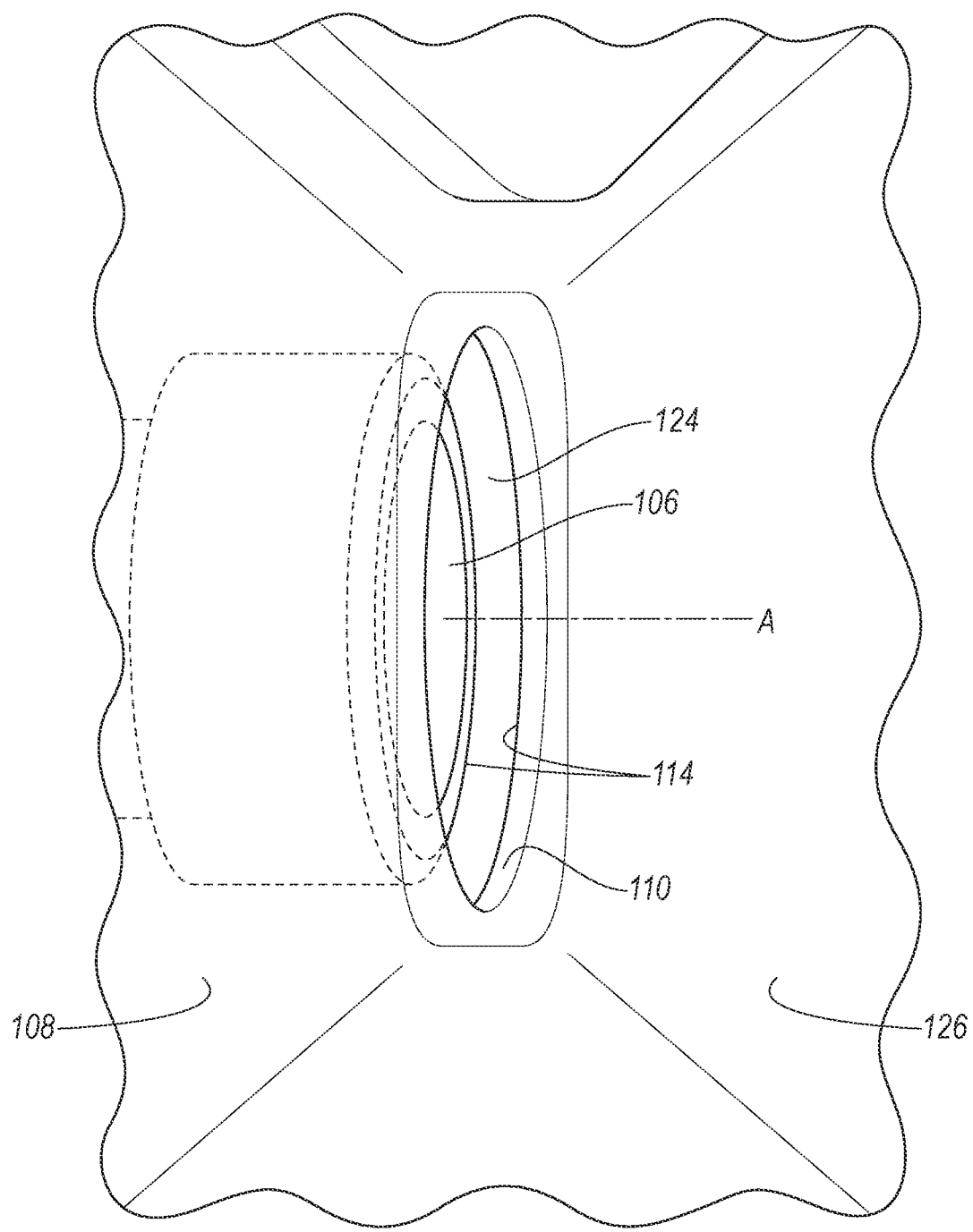
FIG. 7 is a perspective side view of a portion of the sensor assembly.

With reference to FIG. 7, the aperture 110 and the sensor lens 106 define the gap 114. The gap 114 can extend circumferentially around the axis A from the air nozzle 112 to the air nozzle 112, e.g., from one end of the slot shape of the air nozzle 112 away from the air nozzle 112 around the axis A to the other end of the slot shape of the air nozzle 112. The gap 114 can be positioned on an opposite lateral side of the sensor lens 106 from the air nozzle 112. The gap 114 can further be positioned in an upward direction from the sensor lens 106 and in a downward direction from the sensor lens 106. The extent of the gap 114 above and below the sensor lens 106 can help provide smooth airflow across an entirety of the sensor lens 106. The gap 114 can have a constant axial width between the sensor lens 106 and the aperture 110 circumferentially around the axis A from the air nozzle 112 back to the air nozzle 112.

Returning to FIG. 4, the gap 114 is positioned to direct airflow from the air nozzle 112 (as well as spray from the liquid nozzle 144) into the chamber 124. For example, the space axially between the aperture 110 and the sensor lens 106, i.e., the space within the gap 114, can be open to the chamber 124, as shown in FIG. 4. For another example, the gap 114 can be an inlet to tubing (not shown) leading to the chamber 124. The chamber 124 can be structured as a "wet" environment. For example, the sensors 104 positioned in the chamber 124, as well as other components in the chamber 124, can be sealed, e.g., waterproof. The sensors 104, as well as other components in the chamber 124, can have exteriors formed of materials not prone to rust, e.g., plastic.

Figure 8:
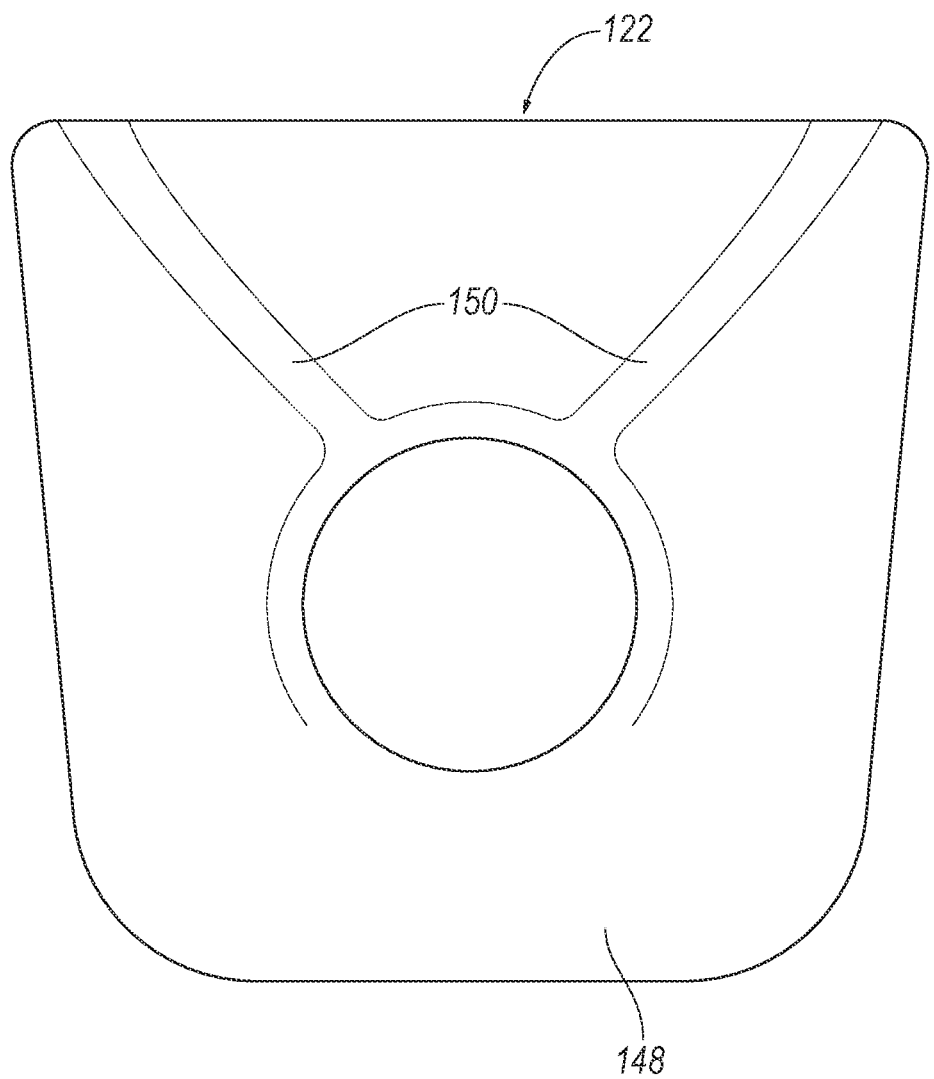
FIG. 8 is a top view of a floor of a housing of the sensor assembly.

With reference to FIG. 8, the housing 122 can include a lower surface 148. The chamber 124 can be formed in part by the lower surface 148. The lower surface 148 can be positioned between the rest of the chamber 124 and, e.g., the roof 120 of the vehicle 100. The housing 122, e.g., the lower surface 148, can include one or more drainage channels 150 positioned inside the chamber 124. The drainage channels 150 can be shaped to direct fluid to outside the housing 122. For example, the drainage channels 150 can be sloped downward to exit points from the housing 122.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor assembly comprising:
a sensor including a sensor lens, the sensor lens defining an axis;
a housing panel including an aperture centered on the axis, the sensor lens being recessed from the aperture along the axis; and
an air nozzle positioned between the aperture and the sensor lens along the axis and oriented to blow horizontally across the sensor lens;
the aperture and the sensor lens defining a gap positioned on an opposite lateral side of the sensor lens from the air nozzle.

2. The sensor assembly of claim 1, wherein the aperture has a circular shape that is orthogonal to the axis.

3. The sensor assembly of claim 1, wherein the aperture and the sensor lens further define the gap positioned in an upward direction from the sensor lens.

4. The sensor assembly of claim 1, wherein the aperture and the sensor lens further define the gap positioned in a downward direction from the sensor lens.

5. The sensor assembly of claim 1, wherein the aperture and the sensor lens further define the gap extending circumferentially around the axis from the air nozzle to the air nozzle.

6. The sensor assembly of claim 5, wherein the gap has a constant axial width between the sensor lens and the aperture circumferentially around the axis from the air nozzle to the air nozzle.

7. The sensor assembly of claim 1, wherein the axis is oriented horizontally.

8. The sensor assembly of claim 1, further comprising a housing including the housing panel, wherein the housing includes a chamber, and the gap is positioned to direct airflow from the air nozzle into the chamber.

9. The sensor assembly of claim 8, wherein the housing includes a drainage channel positioned inside the chamber and shaped to direct fluid to outside the housing.

10. The sensor assembly of claim 8, wherein the sensor is positioned in the chamber.

11. The sensor assembly of claim 8, wherein the sensor is a first sensor, the sensor lens is a first sensor lens, the aperture is a first aperture, the housing panel is a first housing panel, the air nozzle is a first air nozzle, and the gap is a first gap,
the sensor assembly further comprising a second sensor including a second sensor lens defining a second axis, and a second air nozzle,
wherein the housing includes a second housing panel including a second aperture centered on the second axis,
the second sensor lens is recessed from the second aperture along the second axis,
the second air nozzle is positioned between the second aperture and the second sensor lens along the second axis and oriented to blow horizontally across the second sensor lens,
the second aperture and the second sensor lens define a second gap positioned on an opposite lateral side of the second sensor lens from the second air nozzle, and
the second gap is positioned to direct airflow from the second air nozzle into the chamber.

12. The sensor assembly of claim 11, wherein the first sensor and the second sensor are positioned in the chamber.

13. The sensor assembly of claim 1, wherein the housing panel includes a recessed portion, and the aperture is positioned at a most recessed point of the recessed portion.

14. The sensor assembly of claim 13, wherein the recessed portion extends from the aperture radially outwardly and axially away from the sensor lens relative to the axis.

15. The sensor assembly of claim 1, further comprising a blower positioned to supply airflow to the air nozzle.

16. The sensor assembly of claim 15, further comprising a duct positioned to direct airflow from the blower to the air nozzle.

17. The sensor assembly of claim 1, further comprising a liquid nozzle positioned between the aperture and the sensor lens along the axis and oriented to spray across the sensor lens.

18. The sensor assembly of claim 17, wherein the liquid nozzle is positioned circumferentially relative to the axis less than 90° from the air nozzle.

19. The sensor assembly of claim 17, wherein the liquid nozzle is positioned in the gap.

20. The sensor assembly of claim 1, wherein the air nozzle includes an outlet having a slot shape elongated parallel to the sensor lens.

* * * * *